(12) United States Patent
Provitola

(10) Patent No.: US 6,697,429 B2
(45) Date of Patent: Feb. 24, 2004

(54) MOTION VIDEO IMAGE TRANSMISSION SYSTEM USING FRAME-TO-FRAME COMPARISON PROCESSING

(76) Inventor: Anthony Italo Provitola, P.O. Box 2855, DeLand, FL (US) 32721-2855

( * ) Notice: Subject to any disclaimer, the term of this patent is extended or adjusted under 35 U.S.C. 154(b) by 493 days.

(21) Appl. No.: 09/769,806

(22) Filed: Jan. 24, 2001

(65) Prior Publication Data

US 2002/0097799 A1 Jul. 25, 2002

(51) Int. Cl.[7] .............................................. H04N 7/36
(52) U.S. Cl. ............................ 375/240.12; 348/412.1; 382/236; 386/111
(58) Field of Search ................. 375/240.12; 348/412.1; 382/236; 386/111; H04N 7/36

(56) References Cited

U.S. PATENT DOCUMENTS 4,027,331 A * 5/1977 Nicol .................... 375/240.12
5,982,441 A * 11/1999 Hurd et al. .............. 348/417.1

* cited by examiner

Primary Examiner—Howard Britton

(57) ABSTRACT

A system transmitting a motion video image is disclosed which is governed by computer programs that reduce the transmission of all frames but the first of a motion video frame sequence to the transmission of comparison data between each two successive frames in the sequence, and which provides for the reconstruction of the motion video image from the first frame and the comparison data from successive frames.

Figure 1:
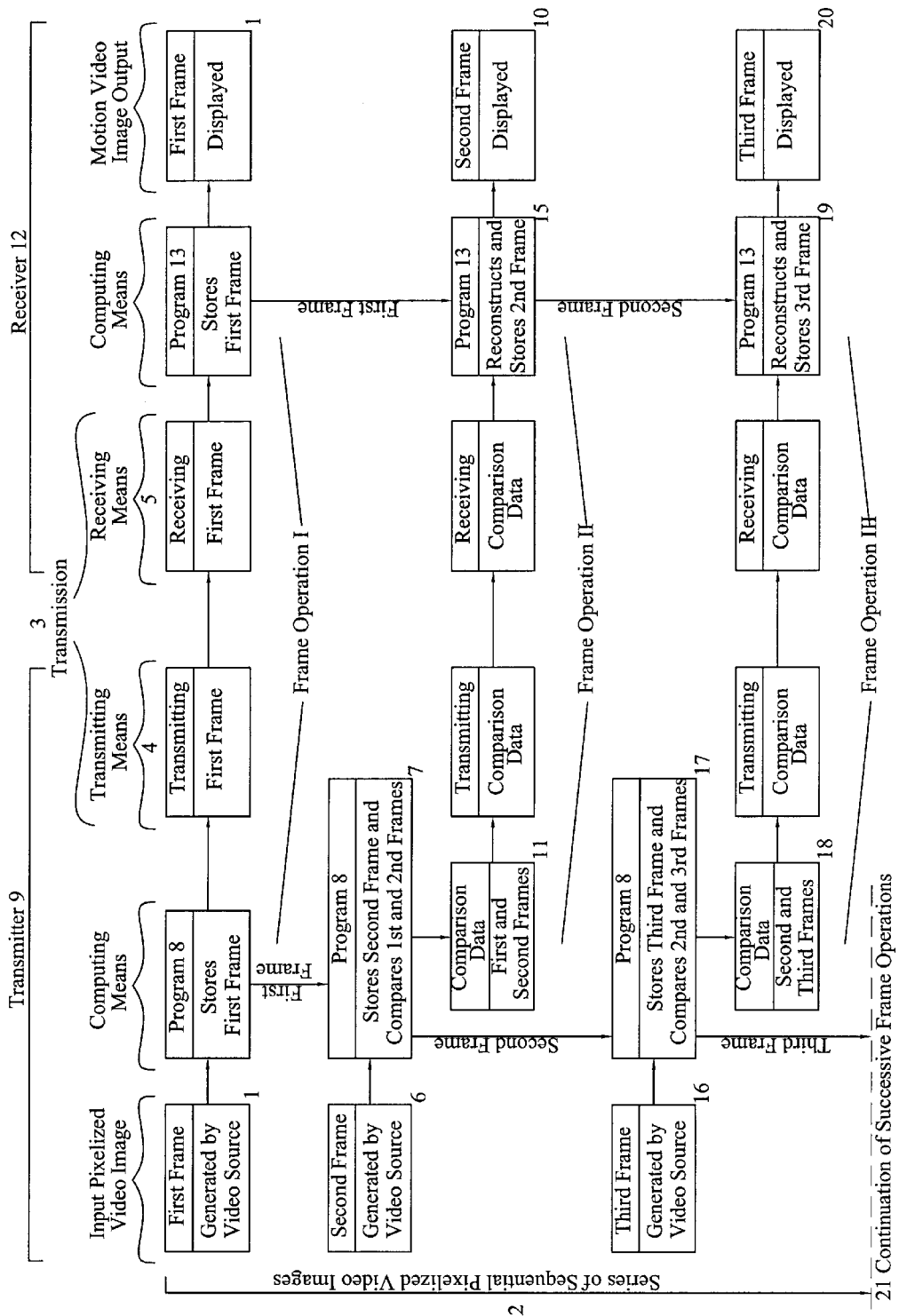

20 Claims, 1 Drawing Sheet

MOTION VIDEO IMAGE TRANSMISSION SYSTEM USING FRAME-TO-FRAME COMPARISON PROCESSING

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

The transmission of motion video over narrow bandwidth is currently limited to relatively small images, which are transmitted with an insufficient number of frames per second to provide the appearance of smooth motion, even with current image compression techniques. Except for the very wide bandwidth lines the motion video image transmitted with current systems is also relatively limited in resolution. It appears that such wide bandwidth service will not be widely available for years to come, and even then it will remain expensive as supply will not be able to keep up with demand. Fortunately, the speed of operation of computers has greatly increased, and continues to increase at a high rate, a rate greatly exceeding the increase in availability of wide bandwidth.

The present invention seeks to take advantage of the increasing speed of computers to provide the maximum use of bandwidth for transmission of motion video, and to make higher resolution and smoother motion video transmittable with higher frame frequency. Naturally, the wider the bandwidth that is available, the greater the resolution of the frames and the smoother motion simulated by the greater frequency of the frame sequences of the video motion image. The present invention, however, provides for an increase in the resolution of the images of the frames of motion video, and an improvement in video motion, for all transmission media, so that even relatively low speed connections, such as those available with a 56K modem, can provide a transmission with greater resolution and smoother motion video. As with bandwidth, the speed of the computers which transmit and receive the motion video will play a role in the smoothness and size of the motion video images.

Other systems using frame-to-frame processing are known from Hurd et al, U.S. Pat. No. 5,982,441, System and Method for Representing a Video Sequence and the references cited therein. The system disclosed in Hurd et al, however, uses a complex mathematical representation of individual frames in terms of a correlation of blocks in successive video frames, rather than the transmission of the difference in a pixel-by-pixel comparison between successive frames.

Other than for image and file compression techniques, there is no prior art that the present invention builds upon except the literature of the subject generally, most of which is cited in Hurd et al.

The present invention has elements that are covered generally by class U.S. Class 348/417 and International Class H04N 7/28.

BRIEF SUMMARY OF THE INVENTION

The present invention is system of computers and computer software to maximize the use of the available bandwidth to transmit motion video by transmitting only that part of a frame of a motion video image that has changed from the previous frame in a motion video frame sequence in order to increase resolution and frame frequency of the motion video image.

The process of frame-to-frame comparison and transmission commences with the first frame in the sequence of a motion video image, which may be transmitted in its entirety. Subsequent frames in the sequence are not transmitted in their entirety, but only the difference in the pixels between each of two frames which are adjacent in the sequence, the comparison data, is transmitted. The latter of the two frames is reconstructed by the receiver from the comparison data and the prior of the two frames, pixel by pixel.

The process may be made subject to certain thresholds with respect to the quantity of data being transmitted, such as the amount of comparison data.

The process may also be enhanced by reducing the amount of comparison data transmitted by compression of the comparison data with standard data compression techniques. The amount of comparison data to be transmitted may also be reduced by transmitting the frames of a sequence of a motion video image in grey-scale, which may then be colorized by the receiver according to a scheme related to the pallette of the first frame.

The system may be utilized in all types of transmitter and receiver combinations, including telephonically or network connected computers and wireless communication devices. The method of image processing and transmission included in the present invention is carried out by computers cooperating with such transmitting and receiving means so as to be controlled by computer programs which effect the scheme of the method, and constitute the apparatus by which the method is carried out.

DETAILED DESCRIPTION OF THE INVENTION

The present invention is system of computers and computer software to maximize the use of available bandwidth to transmit motion video by transmitting only that part of a frame of a motion video image that has changed from the previous frame in the motion video frame sequence.

The principal object of the invention is to increase the resolution of the images of the frames of motion video and to improve the smoothness of such video motion for all types of transmission systems.

Referring to FIG. 1, the principles of the system for frame-to-frame comparison and transmission of motion video images are illustrated in an initial three Frame Operations, I, II, and III, which commence with the input and transmission of the first frame 1 in the frame sequence 2 of a motion video image, the first frame 1 being stored by the computer program 8, and transmitted 3 in its entirety with a resolution with which the transmitting means 4 and receiving means 5 is compatible. The second frame 6 to be transmitted is compared 7 by the computer program 8 of the transmitter 9 with the first frame 1 transmitted, pixel by pixel, and the difference in the images of the first 1 and second 6 frames determined, pixel by pixel. The result of the comparison 7 is a set of values for each pixel in the second frame 6 which is different from the corresponding pixel in the first frame 1, each of the set of values being identified with the location of each pixel in the image. Such pixel values resulting from the comparison 7 of the first frame 1 with the second frame 6, the comparison data 11, are then transmitted 3 to the receiver 12 with the corresponding image locations for each pixel. The computer program 13 of the receiver 12, upon such comparison data 11 being received, changes the pixels in the image of the first frame 1 received 15 with the corresponding pixel values resulting from such comparison 7 of the first 1 and second 6 frames, the comparison data 11, and displays 10 the first frame 1 as altered to include the comparison data 11, thereby reconstructing the image of the second frame 6 in the receiver 12. The image of the first frame 1 and the comparison data 11 for the first 1 and second 6 frames may be stored in the transmitter 9 and receiver 12 for further use.

The process continues with the comparison 17 of the third frame 16 with the second frame 6, and the transmission of the comparison data 18 for the second 6 and third 16 frames to the receiver 12, as in the case of the comparison data 11 transmitted to reconstruct 15 the second frame 6 in the receiver 12. The receiver 12 then reconstructs 19 the image of the third frame 20 with the comparison data 18 by changing the pixels in the image of the second frame 6 received with the corresponding pixels of the comparison data 18. This process may continue indefinitely for successive frames 21 as rapidly as permitted by the available bandwidth, until interrupted by one of the computer programs.

The process continues with the comparison of the third frame with the second frame, and the transmission of the comparison data for the second and third frames to the receiver, as in the case of the pixel values and their corresponding image locations, the comparison data, transmitted to reconstruct the second frame in the receiver. The receiver then reconstructs the image of the third frame with the comparison data created by changing the pixels in the image of the second frame received with the corresponding pixels of the comparison data. This process may continue indefinitely for successive frames as rapidly as permitted by the available bandwidth, until interrupted by the computer programs.

The process may be made subject to certain thresholds with respect to the quantity of data being transmitted. For example, if the comparison data exceeds a certain value, such as one that corresponds to a major change in the image from the image of the previous frame in the sequence, the process may be set to begin again with the transmission of the entire first frame image. Another threshold with respect to the comparison data might also be used to temporarily reduce the resolution of the image of an affected frame in order to maintain the frame frequency.

The process may also be enhanced by reducing the amount of data transmitted by compression of the comparison data to be transmitted with standard data compression techniques. However, prior to application of standard data compression techniques to the comparison data, reduction of the comparison data to be transmitted may also be achieved by other measures. One such measure would be to transmit the frame images in grey-scale. For example, the selection of a grey-scale with 64 shades of gray would reduce the amount of comparison data to be transmitted as compared with a sequence of color images. Such a grey-scale image may also be colorized with the palette of the first frame with which the sequence is commenced. Such colorization may be accomplished by a registration of the colors in the first frame color image corresponding to the shades of gray in the grey-scale, and the transmission of such registration data and the palette with the first grey-scale image. Such colorization schemes may also be made subject to thresholds related to palette changes in the color images that are processed in grey-scale by the transmitter. That is, if the color pallette of a color image of a frame subsequent to the color image of the first frame in the sequence varies from that of the first frame by an amount greater than the threshold set, the system will be reset, and a new color palette and registration data, generated from the color image that caused the threshold to be exceeded, transmitted. A second measure that may be taken prior to the application of standard data compression techniques is to reduce the sharpness of the image transmitted by averaging over a certain number of pixels at the contrast boundaries in the image. It is in the changing of these boundaries that the variation of the video image from frame to frame is perceived, and thus the apparent motion of the video image. If the boundary is a broad average of the adjoining color or grey-scale fields, then motion in the color or grey-scale fields that is affected can be absorbed to some extent in the boundary by eliminating from the transmission of the image the pixel values and corresponding pixel location data for those pixels that do not exceed a threshold in difference from one frame to the next.

The system described may be utilized in all types of transmitter and receiver combinations, including telephonically or network connected computers and wireless communication devices. The method of image processing and transmission included in the present invention is carried out by computers cooperating with such transmitting and receiving means so as to be controlled by computer programs which effect the scheme of the method, and constitute the apparatus by which the method is carried out.

While the invention has been disclosed in connection with a preferred embodiment, it will be understood that there is no intention to limit the invention to the particular embodiment shown, but it is intended to cover the various alternative and equivalent constructions included within the spirit and scope of the appended claims.

What I claim as my invention is:

1. A system for transmitting and receiving a series of sequential pixelized video images comprising:
   (a) at least one transmitter, further comprising:
      (1) at least one transmitting means;
      (2) at least one computing means;
      (3) one or more computer programs which run in said computing means to perform the following operations:
         A. receiving input of a sequence of a plurality of pixelized video images as a series of frames, commencing with a first frame and followed by a next frame, each frame having one pixelized video image;
         B. transmitting the image of the first frame of said sequence after the image of the first frame has been input;
         C. after input of the next frame has been received, comparing the image of the next frame to the image of the previous frame, pixel by pixel, to determine which pixels of the next frame are different from those of the previous frame, the values and locations of the pixels in the next frame being the comparison data between the next frame and the previous frame; and
         D. transmit the comparison data for the next frame with the previous frame together with the identification of each pixel with its location in the image of the next frame;
         E. repetitively perform operations C and D of said one or more computer programs included in said at least one transmitter in sequence for each of the next frames for comparison with the frame previous thereto in the sequence, and transmission of the resulting comparison data, so that said at least one computing means operates according to said one or more computer programs to loop through operations C and D in that order until instructed to stop;

and (b) at least one receiver, further comprising:
(1) at least one receiving means;
(2) at least one computing means;
(3) one or more computer programs which run in said computing means to perform the following operations:
  A. receiving the pixelized video image of the first frame of said sequence from the transmitter;
  B. loading the values of the pixels of the pixelized video image of the first frame into the memory of said at least one computing means included in said receiver;
  C. receiving the comparison data for the next frame with the previous frame;
  D. changing the values of the pixels in the pixelized video image of the previous frame received in memory which correspond to the pixels included in the comparison data to the values of the corresponding pixels of the comparison data for the next frame with the previous frame;
  E. repetitively perform operations C and D of said one or more computer programs included in said at least one receiver in sequence for each of the next frames for comparison with the frame previous thereto in the series, so that said at least one computing means operates according to said one or more computer programs to loop through operations C and D in that order until instructed to stop;

whereby the data of a motion video image is transmitted and received as said series of frames, each of which is a pixelized video image which includes the comparison data.

2. The system of claim 1 wherein the comparison data exceeding a threshold value that corresponds to a major change in the image triggers the commencement of a new series of frames with the sending of a new first frame.

3. The system of claim 1 wherein the comparison data exceeding a threshold value that corresponds to a major change in the image triggers the reduction in the resolution of the image of the frames affected.

4. The system of claim 1 wherein the comparison data diminishing below a threshold value that corresponds to a minor change in the image triggers the increase in the resolution of the image of the frames affected.

5. The system of claim 1 wherein data for the color pallette of the first frame and data for registration of the colors in the first frame of the image with the shades of gray in the grey-scale image of the first frame constitutes the first frame transmitted.

6. The system of claim 1 wherein a grey-scale image which has been received is colorized with the palette of colors of the first frame in the sequence.

7. The system of claim 1 wherein the palette changes in the color images that are processed in grey-scale by the transmitter exceeding a threshold value trigger a reduction in the resolution of the image of the frames affected.

8. The system of claim 1 wherein the palette changes in the color images that are processed in grey-scale by the transmitter exceeding a threshold value trigger the transmission of new palette and registration data generated from the color image that caused the threshold to be exceeded.

9. The system of claim 1 wherein the changes in the boundaries of adjoining or adjacent greys-scale or color fields of the image of a frame exceeding a threshold value trigger an increase in the width of the boundaries, whereby the sharpness of the image decreases.

10. The system of claim 1 wherein the changes in the boundaries of adjoining or adjacent greys-scale or color fields of the image of a frame diminishing below a threshold value triggers a decrease in the width of the boundaries, whereby the sharpness of the image increases.

11. The system of claim 1 wherein the changes in the boundaries of adjoining or adjacent grey-scale or color fields of the image of a frame exceeding a threshold value trigger a reduction in the resolution of the image of the frames affected.

12. The system of claim 1 wherein the changes in the boundaries of adjoining or adjacent greys-scale or color fields of the image of a frame diminishing below a threshold value trigger an increase in the resolution of the image of the frames affected.

13. The system of claim 1 wherein the changes in the boundaries of adjoining or adjacent grey-scale or color fields of the image of a frame exceeding a threshold value trigger a commencement of a new sequence of frames with the sending of a new first frame.

14. The system of claim 1 wherein the comparison data exceeding a threshold value that corresponds to a major change in the image triggers the reduction in the frequency of the transmission of frames in the series.

15. A system for transmitting and receiving a series of sequential pixelized video images comprising:
(a) at least one transmitter means further comprising:
  (1) at least one computer system;
  (2) one or more computer programs which run in said computer system to perform the following operations:
    A. receiving input of a sequence of a plurality of pixelized video images as a series of frames, commencing with a first frame and followed by a next frame, each frame having one pixelized video image;
    B. transmitting the image of the first frame of said sequence after the image of the first frame has been input;
    C. after input of the next frame has been received, comparing the image of the next frame to the image of the previous frame, pixel by pixels to determine which pixels of the next frame are different from those of the previous frame, the values and locations of the pixels in the next frame being the comparison data between the next frame and the previous frame; and
    D. transmit the comparison data for the next frame with the previous frame together with the identification of each pixel with its location in the image of the next frame;
    E. repetitively perform operations C and D of said one or more computer programs included in said at least one transmitter means in sequence for each of the next frames for comparison with the frame previous thereto in the sequence, and transmission of the resulting comparison data, so that said at least one computer system operates according to said one or more computer programs to loop through operations C and D in that order until instructed to stop;

and
- (b) at least one receiver means further comprising:
  - (1) at least one computer system;
  - (2) one or more computer programs which run in said computer system to perform the following operations:
    - A. receiving the pixelized video image of the first frame of said sequence from the transmitter means;
    - B. loading the values of the pixels of the pixelized video image of the first frame into the memory of said at least one computer system included in said receiver means;
    - C. displaying the pixelized video image of the first frame from the values of the pixels in memory;
    - D. receiving the comparison data for the next frame with the previous frame;
    - E. changing the values of the pixels in the pixelized video image of the previous frame received in memory which correspond to the pixels included in the comparison data to the values of the corresponding pixels of the comparison data for the next frame with the previous frame;
    - F. displaying the pixelized video image from memory which includes the comparison data;
    - G. repetitively perform operations D, E and F of said one or more computer programs included in said at least one receiver means in sequence for each of the next frames for comparison with the frame previous thereto in the series, so that said at least one computer system operates according to said one or more computer programs to loop through operations D, E and F in that order until instructed to stop;

whereby the data of a motion video image is transmitted, received, and displayed as said series of frames, each of which is a pixelized video image which includes the comparison data.

16. The system of claim 15 wherein the comparison data exceeding a threshold value that corresponds to a major change in the image triggers the commencement of a new series of frames with the sending of a new first frame.

17. The system of claim 15 wherein the comparison data exceeding a threshold value that corresponds to a major change in the image triggers the reduction in the resolution of the image of the frames affected.

18. The system of claim 15 wherein the comparison data exceeding a threshold value that corresponds to a major change in the image triggers the reduction in the frequency of the transmission of frames in the series.

19. The system of claim 15 wherein the changes in the boundaries of adjoining or adjacent greys-scale or color fields of the image of a frame exceeding a threshold value trigger an increase in width of the boundaries, whereby the sharpness of the image decreases.

20. A system for transmitting and receiving a series of sequential pixelized video images comprising:
- (a) at least one transmitter means further comprising:
  - (1) at least one computer system;
  - (2) one or more computer programs which run in said computer system to perform the following operations:
    - A. receiving input of a sequence of a plurality of pixelized video images as a series of frames, commencing with a first frame and followed by a next frame, each frame having one pixelized video image;
    - B. transmitting the image of the first frame of said sequence after the image of the first frame has been input;
    - C. after input of the next frame has been received, comparing the image of the next frame to the image of the previous frame, pixel by pixel, to determine which pixels of the next frame are different from those of the previous frame, the values and locations of the pixels in the next frame being the comparison data between the next frame and the previous frame;
    - D. transmit the comparison data for the next frame with the previous frame together with the identification of each pixel with its location in the image of the next frame;
    - E. repetitively perform operations C and D of said one or more computer programs included in said at least one transmitter means in sequence for each of the next frames for comparison with the frame previous thereto in the sequence, and transmission of the resulting comparison data, so that said at least one computer system operates according to one or more computer programs to loop through operations C and D in that order until instructed to stop;

and
- (b) at least one receiver means further comprising:
  - (1) at least one computer system;
  - (2) one or more computer programs which run in said computer system to perform the following operations:
    - A. receiving the pixelized video image of the first frame of said sequence from the transmitter means;
    - B. loading the values of the pixels of the pixelized video image of the first frame into the memory of said at least one computer system included in said receiver means;
    - C. receiving the comparison data for the next frame with the previous frame;
    - D. changing the values of the pixels in the pixelized video image of the previous frame received in memory which correspond to the pixels included in the comparison data to the values of the corresponding pixels of the comparison data for the next frame with the previous frame;
    - E. repetitively perform operations C and D of said one or more computer programs included in said at least one receiver means in sequence for each of the next frames for comparison with the frame previous thereto in the series, so that said at least one computer system operates according to said one or more computer programs to loop through operations C and D in that order until instructed to stop;

whereby the data of a motion video image is transmitted and received as said series of frames, each of which is a pixelized video image which includes the comparison data.

* * * * *